May 22, 1962 W. S. BUSLIK ETAL 3,035,295

MAGNETIC TAPE CLEANER

Filed July 2, 1956

INVENTORS
WALTER S. BUSLIK
VICTOR R. WITT

BY Joe L. Koerber
ATTORNEY

United States Patent Office 3,035,295

Patented May 22, 1962

3,035,295

MAGNETIC TAPE CLEANER

Walter S. Buslik, Poughkeepsie, and Victor R. Witt, Wappingers Falls, N.Y., assignors to International Business Machines Corporation, New York, N.Y., a corporation of New York Filed July 2, 1956, Ser. No. 595,172
1 Claim. (Cl. 15—93)

This invention relates to improvements in the art of magnetic recording and more specifically to a magnetic tape cleaner for maintaining the surface of magnetic recording tape free of undesirable particles.

Magnetic tape is commonly used on recorders in conjunction with computers. Information is recorded on the tape by magnetizing discrete areas or spots of the tape in one or the other of two magnetic states. When recording on, or reading from magnetic tape, it is advantageous to have the contacting surface as a smooth and free of foreign matter as possible in order to maintain intimate contact of the tape with the recording head.

It is the principal object of this invention to provide an improved tape cleaner for use on magnetic recorders.

Another object of this invention is to provide a tape cleaner for removing undesirable particles from the recording surface of a magnetic tape without impairing the recording surface.

Other objects of the invention will be pointed out in the following description and claim and illustrated in the accompanying drawings, which disclose, by way of example, the principle of the invention and the best mode, which has been contemplated, of applying that principle.

Figure 4:
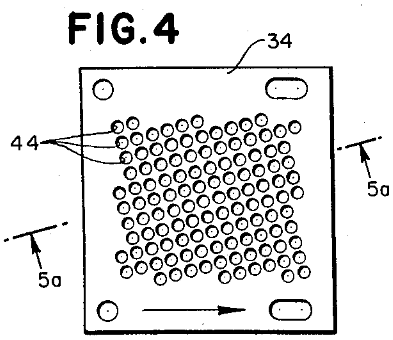
FIG. 4 is a top view of the tape cleaner.

FIGS. *5a* and *5b* are sectional views of cleaners taken on line 5—5 in FIG. 4.

One form of magnetic tape comprises a plastic backing having a magnetic oxide coating for the recording surface. The tape is moved past the recording head at which time coded information is recorded by magnetizing discrete spots of the oxide coating in one of two saturated magnetic states. A recorded tape may be moved past a read head at which time the recorded spots are detected by the read head.

It is not uncommon to record coded information on magnetic tape at densities up to 500 bits per inch. With such high density recording, stringent specifications as to the quality of magnetic tape are required. In addition, the recording surface of the tape must be kept free of all foreign materials as well as bits which may flake off the recording surface in order to maintain intimate contact of the tape with the head.

Tape defects which usually consist of foreign matter or irregularities in the tape surface cause loss of information by moving the tape away from the read and/or record head. The recorded wave length is such that if the entire tape is separated from the head by 1 mil, the read voltage pulse amplitude will be appreciably reduced. Interference pulses are generated when a magnetized portion of the tape is moved rapidly away from the head gap. It is the rate of speed at which a portion of the tape is moved away from the head that is important as far as the amplitude of the interfering pulses are concerned. Therefore, it may be seen that, in addition to the defect size, the shape and contour of the surface irregularity is also important.

Oxide flakes from the recording surface may cause both information signal and interference signal errors depending upon the size and shape of the particle.

White crystalline and powder deposits generally cause signal dropouts rather than interfering pulses. These are believed to be formed by deposits from the tape backing and from small particles of felt from a pressure pad which is sometimes used to hold the tape against the head. Heat generated by friction between the tape and the pressure pad tends to combine the small particles into larger ones. Fibers and other foreign materials also accumulate on the tape and cause errors. The quality of the reading and recording is improved by the removal of the foregoing particles.

Figure 1:
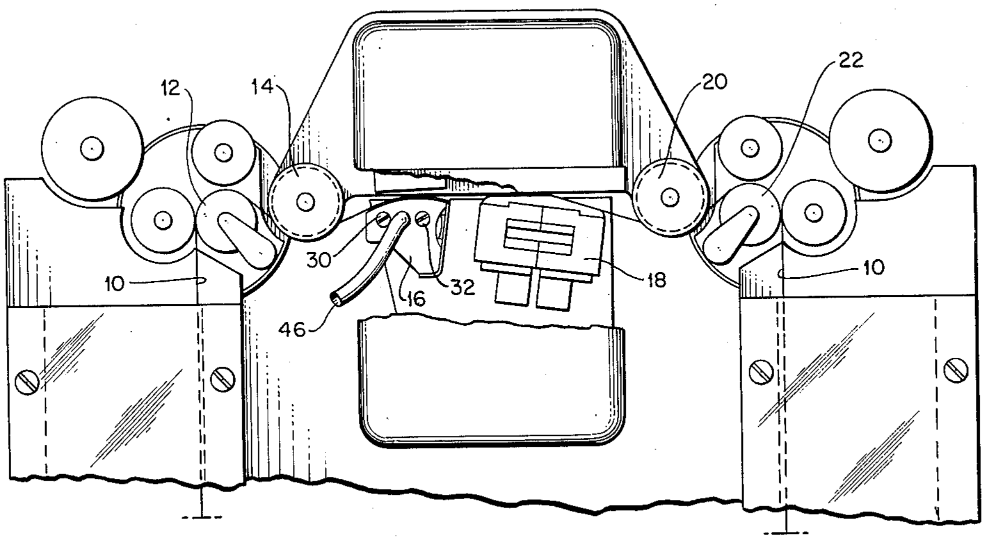
FIG. 1 is an elevation of a tape handling machine showing the location of the tape cleaner relative to the tape and the read/record head.

Referring to FIG. 1, a tape 10 is fed over rollers 12 and 14, over a tape cleaner assembly, generally designated 16, over a read and/or record head 18 and rollers 20 and 22. The reading, recording and drive means are not a part of the present invention and therefore are not described in detail. They may comprise, for example, the tape machine disclosed in Patent Number 2,919,076, granted December 29, 1959, to W. S. Buslik and T. L. Vinson. The cleaner assembly 16 is located in close proximity to the head 18 and preferably on the side from which the tape 10 approaches the head 18 to assure removal of particles just prior to arrival of a section of the tape at the head.

The tape 10, is maintained in contact with the cleaner and head, through tension applied between the rollers 12—14 and 20—22.

Figure 2:
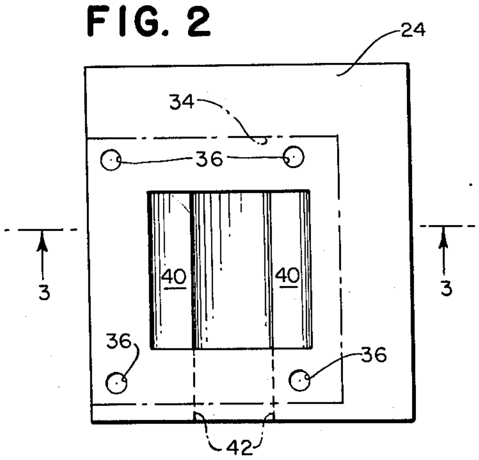
FIG. 2 is a top view of the block upon which the tape cleaner is secured.
Figure 3:
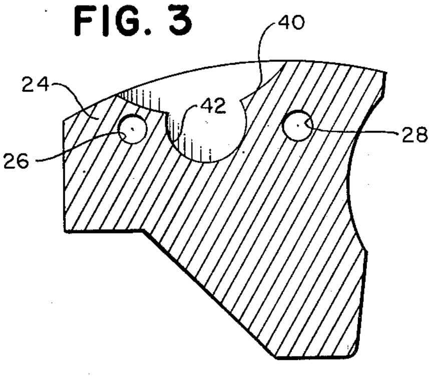
FIG. 3 is a sectional view taken on line 3—3 in FIG. 2.

Referring to FIGS. 2 and 3, a cleaner assembly base 24 is shown. Holes 26 and 28 are shown for mounting the base adjacent the head 18 by bolts 30 and 32, shown in FIG. 1. A cleaner head 34 is shown in FIGS. 4 and *5a*, and in dotted outline in FIG. 2, in the position in which it is held by screws (not shown) in holes 36. A sectoral depository 40, shown in FIGS. 2 and 3 is milled out of the base 24, under the area covered by the head 34. A hole 42 is drilled into the base 24 to a depth bringing it through one side of the milled depository 40 and flush with the other side thereof.

Many openings 44, preferably but not necessarily circular in shape, are formed in the head 34 for scraping the undesirable particles from the recording surface of the tape as it passes thereover. The removed particles drop through the openings 44 into the depository 40, and into the hole 42 through which they are removed. The particles may be removed by gravity and machine vibration or by vacuum applied to the hole 42, as represented in FIG. 1, by a vacuum hose 46. Any suitable vacuum producing device may be attached to the hose 46.

Figures 5A, 5B:
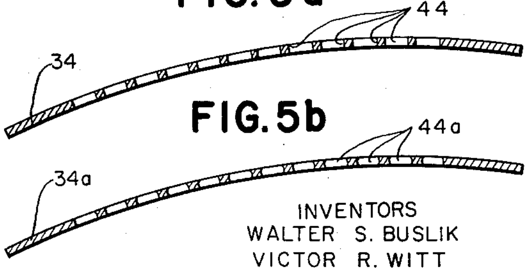

Referring to FIGS. 4 and 5, the cleaner head 34 comprises a sheet of chromium plated steel having a plurality of parallel rows of holes 44. The head 34 preferably is curved to facilitate intimate contact between the tape and the head. The holes may be made by any suitable method which produces sharp edges with the head surface. The edges may be right-angle edges as shown in FIG. *5a*, or may be undercut as shown in an alternate version 34*a*, FIG. *5b*. The undercut holes 44*a*, FIG. *5b*, may be formed, for example, by etching. In the preferred embodiment, the holes are .045 inch in diameter on .062 inch centers. The rows of holes are placed at an angle to the edge of the head 34 or 34*a* and to the direction of tape movement, as indicated in FIG. 4 by the arrow, whereby any point of a tape 10, in moving across the head 34 or 34*a*, encounters several of the holes 44 or 44*a*.

The intimate contact of the tape 10 with the cleaner head brings any protruding foreign particles into engagement with the right-hand sides of the holes, as viewed in FIG. 4, whereby the foreign particles are shaved off by the sharp edges of the holes. Due to the small size of the holes 44 or 44_a_, the tape cannot dip into a hole in which position the recording surface might be worn or damaged by the cutting edges.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claim:

What is claimed is:

A magnetic tape cleaning device comprising, in combination, a tape cleaner support having a depository therein, a tape cleaner mounted on said support directly above said depository, said depository opening upwardly towards said cleaner, said cleaner consisting of a plate containing a plurality of openings, the size of said openings being a small fraction of the width of a magnetic tape and said openings being so arranged as to encompass the entire width of a tape path thereacross and means for moving a tape across said plate in intimate contact with said plate and the edges of said openings so that each point on said tape encounters a plurality of said openings and the edges of said openings serve to clean the contacting surface of said tape.

References Cited in the file of this patent

UNITED STATES PATENTS

| | | |
|---|---|---|
| 566,554 | Young et al. | Aug. 25, 1896 |
| 971,889 | Hoglund | Oct. 4, 1910 |
| 1,543,297 | Robinson | June 23, 1925 |
| 2,059,263 | Miller | Nov. 3, 1936 |
| 2,095,471 | Hayward | Oct. 12, 1937 |
| 2,142,711 | Birch | Jan. 3, 1939 |
| 2,191,691 | Woolf | Feb. 27, 1940 |
| 2,288,983 | Weiss | July 7, 1942 |
| 2,563,362 | Porter | Aug. 7, 1951 |
| 2,563,445 | Zenner | Aug. 7, 1951 |
| 2,689,196 | Daniels | Sept. 14, 1954 |
| 2,778,634 | Gams | Jan. 22, 1957 |
| 2,779,046 | Queirolo | Jan. 29, 1957 |